(12) United States Patent
Okada et al.

(10) Patent No.: US 6,174,620 B1
(45) Date of Patent: Jan. 16, 2001

(54) PRISMATIC SEALED BATTERY AND METHOD OF MANUFACTURING THE SAME

(75) Inventors: Naotada Okada, Yokohama; Katsuhisa Homma, Yokosuka; Masahiro Kato, Yokohama, all of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/115,237

(22) Filed: Jul. 14, 1998

(30) Foreign Application Priority Data

Jul. 14, 1997 (JP) .................................................... 9-187989
Oct. 28, 1997 (JP) .................................................... 9-295081

(51) Int. Cl.$^7$ .................................................... H01M 2/02

(52) U.S. Cl. .......................... 429/176; 429/163; 429/177; 29/623.1

(58) Field of Search ..................................... 429/163, 176, 429/177, 175; 29/623.1

(56) References Cited

U.S. PATENT DOCUMENTS 6,007,944 * 12/1999 Bechtold et al. .................... 429/211

* cited by examiner

Primary Examiner—Stephen Kalafut
Assistant Examiner—M. Wills
(74) Attorney, Agent, or Firm—Oblon, Spivak, McClelland, Maier & Neustadt, P.C.

(57) ABSTRACT

A metallic outer case has an opening portion. A first corner portion is provided at an outer periphery of the opening portion. A power generating element is stored within the outer case. The power generating element has a positive electrode and a negative electrode opposed to each other, with a separator interposed. An end face of the opening portion is sealed by a metallic cover member. The cover member has a second corner portion corresponding to the first corner portion of the outer case, and welded to the outer case, with a coupled portion between the cover member and the outer case irradiated with a laser beam. Those portions of the first corner portion of the outer case and the second corner portion of the cover member, which are irradiated with the laser beam, are shaped as angular portions of substantially the same shape.

21 Claims, 10 Drawing Sheets

PRISMATIC SEALED BATTERY AND METHOD OF MANUFACTURING THE SAME

BACKGROUND OF THE INVENTION

The present invention relates to a prismatic sealed battery obtained by coupling a cover member to an opening portion of a prismatic outer case and welding the cover member and the opening portion, and to a method of manufacturing the prismatic sealed battery.

Recently, because of an increasing demand of portable OA devices and communication devices, there is a great demand for prismatic sealed batteries as power supplies. In particular, nickel metal hydride rechargeable batteries and lithium ion rechargeable batteries, the prismatic sealed batteries are small in size and can be mounted in the above devices with high volume efficiency.

In general, the prismatic sealed battery has an outer case 1A provided with an opening portion 3A, as shown in FIG. 1. A cover member 2A is coupled to the opening portion 3A of outer case 1A, and a coupling portion between these members is hermetically welded by a laser beam L.

When the laser beam L is radiated on the lateral side of the outer case 1A and scanned along the coupling portion between the outer case 1A and cover member 2A, the scan direction of laser beam L is controlled in the X- and Y-directions along the outer peripheral surface of outer case 1A in FIG. 1.

In a case where the laser beam L is incident on the lateral side of outer case 1A and scanned in the X- and Y-directions for welding, however, it is difficult to treat a corner portion R of outer case 1A and a corner portion r of cover member 2A. Specifically, if the laser beam L is scanned linearly in the X- and Y-directions, the laser beam L is not incident perpendicular to the outer periphery of the outer case 1A and cover member 2A at the corner portions R and r of outer case 1A and cover member 2A.

For example, when the radius of curvature of corner portion R, r is set at about 2.0 mm, an angle θ between the direction of radiation of laser beam L and a plane normal to a tangential line (including a surface to be welded) of the corner portion, R, r is 45° at maximum. At this time, the area of radiation of laser beam L increases 1. 41 times (=1/cos 45°).

Consequently, the radiation energy density (fluence: $J/cm^2$) of laser beam L decreases by about 40%, compared to the case where beam L is incident perpendicular to the surface to be welded. In general, the allowance in a laser welding process with respect to a variation in the fluence is ±10%. Under the above condition, the depth of weld penetration also decreases and the strength of bonding deteriorates. As a result, cracks may occur at the welded portion.

In particular, in a case where the outer case 1A and cover member 2A is formed of aluminum or aluminum alloy in order to reduce weight, cracks will easily occur and the yield of manufactured products will considerably deteriorate. In order to achieve good welding, the condition, cos θ>0.9, needs to be satisfied. Therefore, it is desirable to meet the condition, θ<25°.

In a case where the outer case 1A and cover member 2A are formed of steel or stainless steel, the radius of curvature of the entire outer case including corner portions R, r is set to a small value, e.g. about 1.0 to 1.3 mm. Thereby, a deviation in angle of radiation of the laser beam L on the outer periphery of the corner portion R, r is decreased, and the strength of bonding is prevented from deteriorating.

In the case of using aluminum or aluminum alloy, however, if the radius of curvature of the corner portion R, r is decreased, the stress will concentrate at the corner portion R, r when the pressure in side the outer case 1A increases, and the rigidity thereof decreases. Since the strength of the aluminum or aluminum alloy itself is low, the radius of curvature of the corner portion R, r needs to be increased. Because of this, a deviation in angle of radiation of the laser beam L increases and the depth of welding penetration at the welded portion decreases. As a result, the welding strength decreases.

If the scan direction of the laser beam L is turned in accordance with the curvature of the corner portion R, r, such problem will not arise. However, if the scan direction of the laser beam L is turned along the corner portion R, r, the control for scanning the laser beam L becomes intricate and the cost of the scan device increases. Furthermore, a process time increases. Therefore, this measure is not practical.

On the other hand, the cross section of the outer case 1A of the prismatic sealed battery, which is parallel to the opening portion 3A, is formed prismatic (including a curve of the corner portion R), and the wall thickness (i.e. thickness of material forming the outer case) of a long-side portion 4A is equal to that of a short-side portion 5A.

If the wall thickness is not sufficient, the rigidity of the outer case 1A decreases. Thus, if a gas is produced by a chemical reaction of an electrolyte while a power generating element in the secondary battery is being charged, the internal pressure of the outer case 1 increases and, as indicated by solid-line arrows in FIG. 3, the inner surface of the long-side portion 4A of outer case 1A is pressurized in the direction of expansion and deformed.

Consequently, a bending moment is applied at the corner portions R, as indicated by broken-like arrows, and the short-side portions 5A are deformed inward by the bending moment and the entire outer case 1A is deformed.

BRIEF SUMMARY OF THE INVENTION

An object of the present invention is to provide a prismatic sealed battery and a method of manufacturing the same, wherein when an outer case and a cover member are welded, a decrease in depth of weld penetration at corner portions due to a large variation in radiation angle of a laser beam is prevented.

Another object of the invention is to provide a prismatic sealed battery and a method of manufacturing the same, wherein an outer case is not easily deformed due to a rise in internal pressure.

According to the present invention, there is prismatic sealed battery comprising:

a metallic outer case having an opening portion and a first corner portion at an outer periphery of the opening portion;

a power generating element stored within the outer case and having a positive electrode and a negative electrode opposed to each other, with a separator interposed;

a metallic cover member coupled to an end face of the opening portion of the outer case, provided with a second corner portion corresponding to the first corner portion of the outer case, and welded to the outer case, with a coupled portion between the cover member and the outer case irradiated with a laser beam; and an electrode element electrically connected to the power generating element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
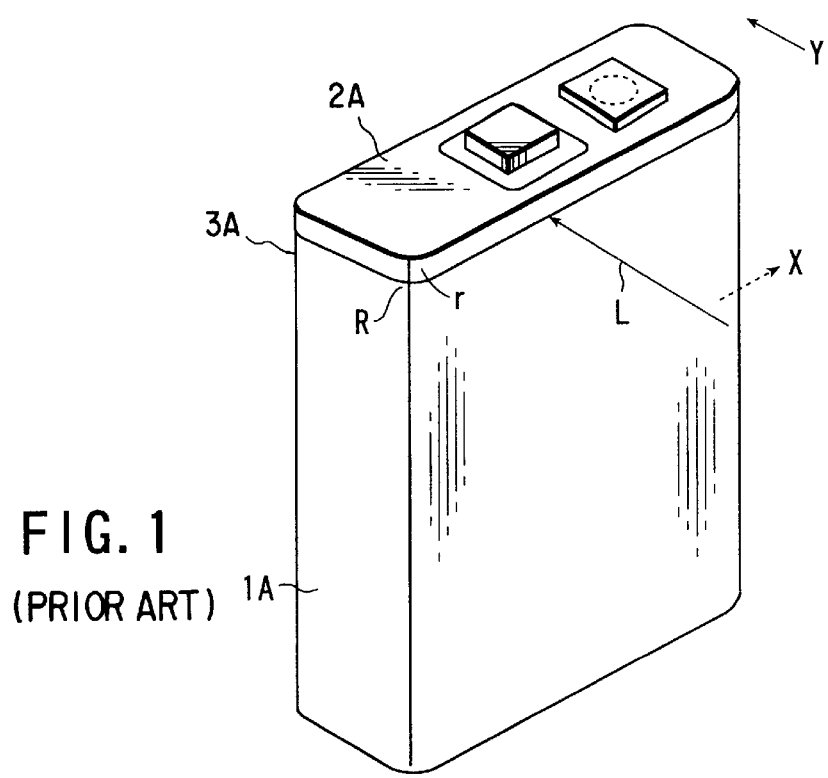
FIG. 1 is a perspective view of a conventional prismatic sealed battery.
Figure 2:
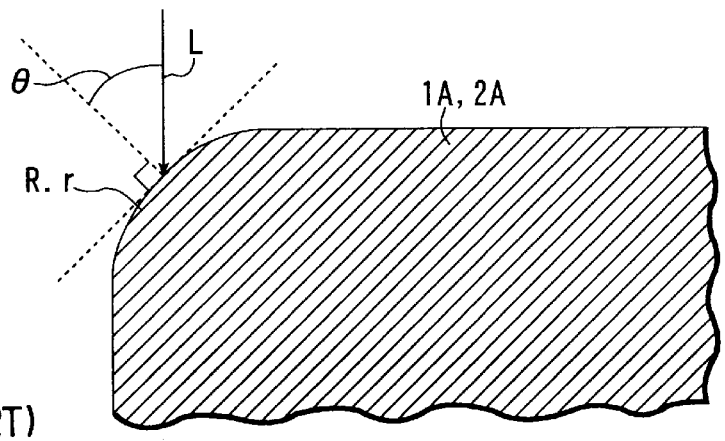
FIG. 2 is a view illustrating a welding state of a corner portion of the battery.
Figure 3:
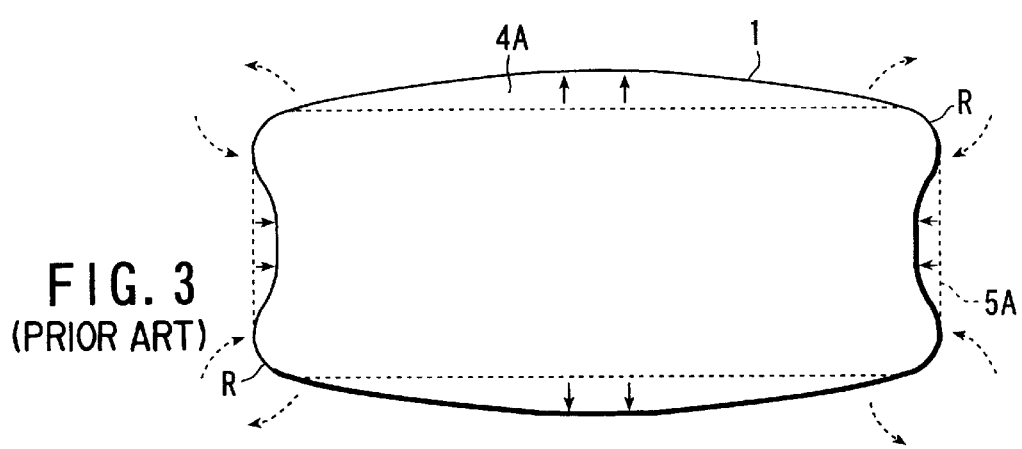
FIG. 3 is a view illustrating a state of deformation due to a rise in internal pressure of an outer case of the battery.

FIGS. 4 to 11 show a first embodiment of the invention. A prismatic sealed battery according to the first embodiment has a structure as shown in FIG. 1. Specifically, the prismatic sealed battery has a metallic outer case 1 having a bottomed prismatic shape with an upper end face opened. The outer case 1 serves also as a positive electrode terminal, and an insulating film 6 is disposed on an inner face of a bottom portion of the case 1.

An electrode member 7 serving as a power generating element is housed within the outer case 1. In the case of a lithium ion secondary battery, the electrode member 7 is formed in the following manner. A negative electrode 8 of aluminum thin film, on both sides of which an active substance containing a carbonaceous material is coated, a separator of porous polypropylene sheet, and a positive electrode 10 of copper thin film, on both sides of which an active substance containing lithium nickel oxide or lithium cobalt oxide is coated, are spirally wound with an oval cross section such that the positive electrode 10 is situated on the outermost side.

The outer case 1 and electrode member 7 are electrically connected via a cover member (described below). Specifically, a positive electrode lead 11 is extended from the positive electrode 10, and the positive electrode lead 11 is connected to that face of the cover member 2, which is opposed to the electrode member 7. A through-hole (not shown) for passage of a negative electrode terminal 12 is formed in a central portion of the cover member 2. An injection port 14 of electrolyte is provided at a predetermined distance from the through-hole. A spacer 13 of synthetic resin, which serves as an electric insulator is provided between the cover member 2 and an upper end of the electrode member 7 within the outer case 1.

The cover member 2 is coupled to an opening portion 3 at the upper end of the outer case 1 by means of welding or the like. The negative electrode terminal 12 projecting from the central area of the cover member 2 is hermetically sealed in the through-hole by means of a glass or resin insulator 15. A negative electrode lead 16 is connected at one end to a lower end face of the negative electrode terminal 12, and the other end of the negative electrode lead 16 is connected to the negative electrode 8.

After the electrolyte is filled in the outer case 1, the injection port 14 is sealed by a seal cover 14A of a metallic plate which is hermetically welded on the cover member 2.

Alternatively, after the electrolyte is filled in the outer case 1, the upper opening of the outer case 1 may be sealed by the cover member 2, without forming the injection port 14 in the cover member 2.

In the case of the lithium ion secondary battery, the electrolyte is an organic solvent consisting of ethylene carbonate or propylene carbonate, which contains an electrolyte substance such as lithium perchlorate, lithium borofluoride, lithium hexafluoride or phosphor lithium hexafluoride.

The entire outer surface of the cover member including the seal cover 14A is covered with an upper insulation paper sheet 17. A lower insulation paper sheet 19 having a slit 18 is provided on an inner bottom face of the outer case 1. One side portion of a two-fold PTC (Positive Thermal Coefficient) element 20 is interposed between the bottom face of the outer case 1 and the lower insulation paper sheet 19, and the other side portion of the PTC element 20 is extended to the outside through the slit 18.

An outer tube 21 is provided to extend from the side faces of outer case 1 to peripheral portions of the upper and lower insulation paper sheets 17 and 19. The upper and lower insulation paper sheets 17 and 19 are fixed to the outer case 1. With this structure of the outer tube 21, the above-mentioned outward-extending portion of the PTC element 20 is bent toward the bottom surface of lower insulation paper 19.

The cover member 2 is hermetically welded to the opening portion 3 of prismatic outer case 1 by means of laser welding. The method of fixing the cover member 2 to the prismatic outer case 1 by laser welding has been put into practice since the opening portion 3 of prismatic outer case 1 can be closed, minimizing the loss of the volume efficiency.

A cross section of the outer case 1, which is parallel to the opening portion 3 that is to be coupled to the cover member 2 after the power generating element has been inserted, is prismatic. The wall thickness of a long-side portion 4 of the case 1 is set at 0.5 mm, and that of a short-side portion 5 is set at 0.7 mm. The outer case 1 is formed of an aluminum-based metal containing 0.05 wt % or less of Mg and 0.2 wt % or less of Cu.

Thereby, in case solidification by cooling occurs after laser welding, formation of cracks at the coagulation point is suppressed. For example, materials of AA standards 3003, 3004, 1050, 1100 and 1200 are preferable. These materials are pressed by deep drawing or cold shock process in the shape of outer case 1.

Figure 6:
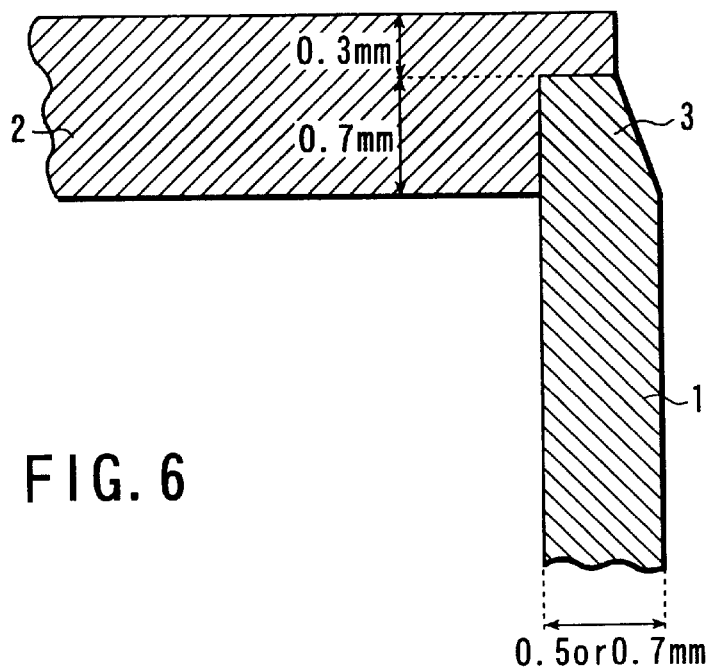
FIG. 6 is a cross-sectional view showing a coupling state of portions of the outer case and a cover member in the first embodiment.

As is shown in FIG. 6, the cover member 2 has a prismatic thin-plate shape and includes a stepped portion 2a of 0.3 mm at its periphery. The stepped portion 2a is coupled to the upper end face of the opening portion 3 of outer case 1.

The outer peripheral face of the stepped portion 2a is continuous with the outer peripheral face of outer case 1 with no stepped portion. It is desirable that the cover member 2 have a thickness of 0.8 mm or more, and preferably 0.9 to 1.5 mm. If the thickness is less than 0.8 mm, the strength decreases.

Figure 5:
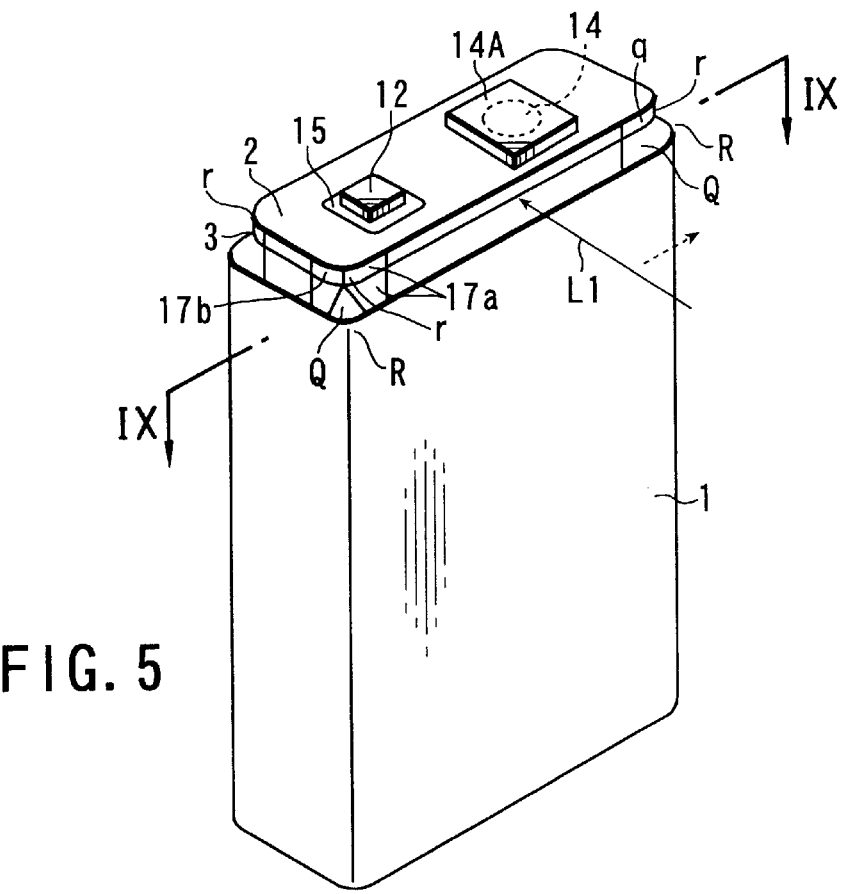
FIG. 5 is a perspective view of an outer case of the battery according to the first embodiment.

If the cover member 2 is coupled to the opening portion 3 of outer case 1, a laser beam $L_1$ from a YAG laser is incident onto the coupled portion (i.e. faces to be welded) between the outer case 1 and cover member 2, and the laser beam $L_1$ is scanned in the direction of an arrow in FIG. 5. A convergence diameter (laser spot diameter) of the laser beam $L_1$ is 0.4 to 0.5 mm.

In this manner, the coupled portion is seam-welded so that a welded portion with a diameter of about 0.8 mm is continuously formed. The outer case 1 is thus sealed by the cover member 2. The conditions for the YAG laser (wavelength: 1.06 μm) are as follows: repetition rate=20 to 30 Hz; pulse width=3 to 5 ms; movement (scan) speed=5 to 10 mm/s; and overlap ratio=70 to 80%. The coupled portion is welded while nitrogen gas is being applied thereto, thereby preventing formation of porosities due to oxidation of structural members of outer case 1 during welding.

The YAG laser is used to emit the laser beam $L_1$ because the YAG laser has a shorter wavelength than a carbon dioxide laser and has a lower reflectance on aluminum or an alloy thereof than the carbon dioxide laser. Accordingly, the YAG laser can achieve more efficient welding. The laser beam $L_1$ is emitted from the laser oscillator (not shown), passing through an optical fiber and a lens (both not shown) and converged onto the coupled portion. The laser beam $L_1$ is used for welding, with the optical axis of the laser beam $L_1$ being set in a range of 20° with respect to a line normal to the coupled portion. The laser beam is scanned while the lens is situated to keep a predetermined angle and distance with respect to the coupled portions of the long-side portion 4 and short-side portion 5 of outer case 1.

Figure 7:
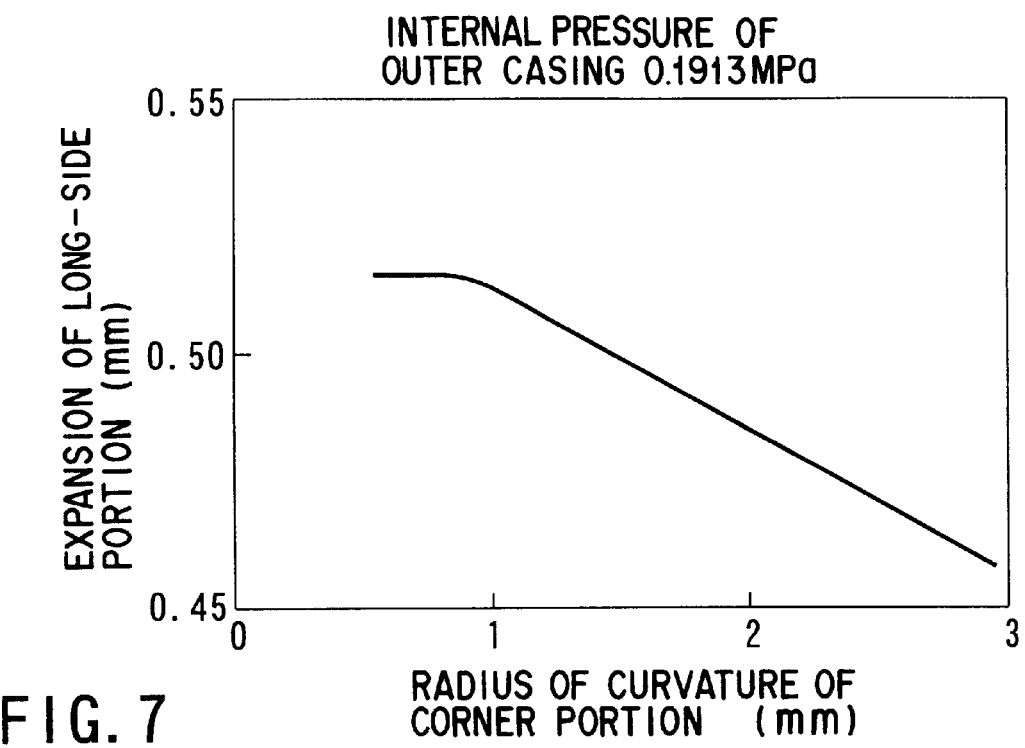
FIG. 7 is a graph showing a relationship between the corner portion and the expansion of a long-side portion of the outer case in the first embodiment.
Figure 8:
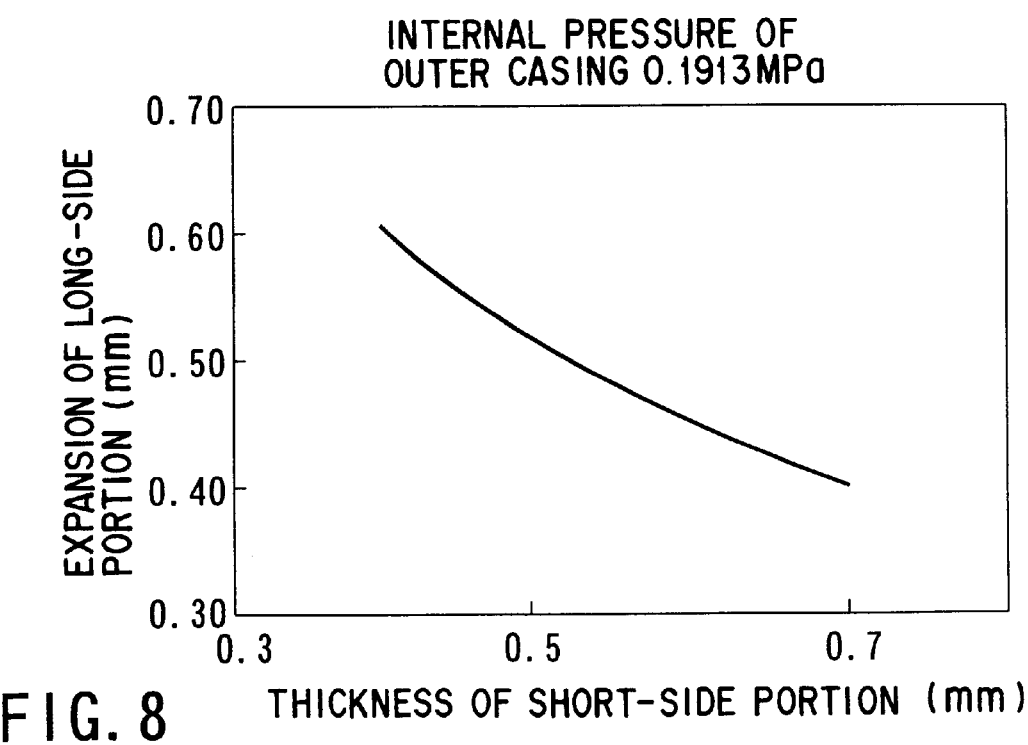
FIG. 8 is a graph showing a relationship between the thickness of a short-side portion of the outer case and the expansion of the long-side portion in the first embodiment.

The inventor has conducted experiments in order to set the shape of the outer case 1 which is not easily deformed due to internal pressure and does not incur an increase in weight. The inventor has obtained results as illustrated in FIGS. 7 and 8. Table 1 (below) shows dimensions of the outer case 1 which were used as reference dimensions in the experiments. In Table 1, "width" refers to a length of the long-side portion 4, "thickness" to a length of the short-side portion, and "height" to a length between the bottom of outer case 1 and the coupled portion of the cover member 2.

FIG. 7 shows a relationship between the corner portion R shown in FIG. 5 and the expansion of long-side portion 4 of outer case 1, which was obtained by using the outer case 1 with the above dimensions. The internal pressure in the outer case 1 was set at 0.1913 MPa (atmospheric pressure +0.09 MPa). The degree of expansion is defined as a maximum outward displacement of the long-side portion 4, as shown in FIG. 7, with the shape of outer case 1 at the time of atmospheric pressure of 0.1013 MPa being adopted as a reference shape. It is understood, from FIG. 7, that as the radius of curvature of corner portion R increases, the degree of expansion decreases and deformation of outer case 1 can be effectively suppressed. At the same time, the surface area of outer case 1 decreases and accordingly the weight decreases.

FIG. 8 shows a relationship between the wall thickness of the short-side portion 5 and the expansion of long-side portion 4 of outer case 1, which was obtained by using the outer case 1 with the above dimensions. In this case, too, the internal pressure in the outer case 1 was set at 0.1913 MPa (atmospheric pressure +0.09 MPa). The degree of expansion is defined as a maximum outward displacement of the long-side portion 4, as shown in FIG. 8, with the shape of outer case 1 at the time of atmospheric pressure of

TABLE 1

| Standard Container Dimensions (unit: mm) | | | | | |
|---|---|---|---|---|---|
| Height | Width | Thickness | Thickness of short-side portion | Thickness of long-side portion | Radius of curvature of corner portion |
| 45 | 29.6 | 6.0 | 0.5 | 0.5 | 0.5 |

TABLE 2

Examples of battery outer case dimensions (unit: mm)

| Thickness of short-side portion | Thickness of long-side portion | Radius of curvature of corner portion |
| --- | --- | --- |
| 0.7 | 0.5 | 2.0 |
| 0.6 | 0.5 | 2.0 |
| 0.6 | 0.4 | 2.0 |
| 0.6 | 0.4 | 2.0 |

In the present embodiment, the radius of curvature of the corner portion R of opening portion 3 is increased for the purpose of suppressing the expansion of outer case 1. Then, as described in the "BACKGROUND OF THE INVENTION", the angle of incidence of the laser beam $L_1$ on the welded portion may increase. As a result, the welded portion between the cover member 2 and opening portion 3 may become defective.

Accordingly, it is considered that if the radius of curvature of the corner portion R of outer case 1 is increased to enhance the strength of the case 1 and the outer periphery of the opening portion 3 in the height direction of outer case 1 is shaped as an angular portion Q, defective welding between the cover member 2 and case 1 may be prevented. Needless to say, the corner portion r of cover member 2 is also shaped as an angular portion q, similarly with the corner portion R of outer case 1.

In this case, the angular portion Q, q must 0.1013 MPa being adopted as a reference shape.

It is understood, from FIG. 8, that if the wall thickness of the short-side portion 5 is increased, for example, from 0.5 mm to 0.7 mm, the degree of expansion of long-side portion 4 decreases by about 20%. In this case, as regards the dimensions shown in Table 1, the weight of entire outer case 1 was increased only by 0.1 g, i.e. from 4.5 g to 4.6 g. This contributes to reducing the weight of the battery including a power generating element.

In actual products, about 8% of the length of the short-side portion 5 (thickness of outer case 1) is allowed as expansion of the long-side portion 4 (width of outer case 1). Thus, as the thickness of outer case 1 increases, the wall thickness of short-side portion 5 may be smaller. The dimensions in Table 2 (below), in which the wall thickness of short-side portion 5 is greater than that of the long-side portion 4, may be regarded as an example of proper dimensions.

TABLE 2

Examples of battery outer case dimensions (unit: mm)

| Height | Width | Thickness |
| --- | --- | --- |
| 44.5 | 29.6 | 6.0 |
| 44.5 | 28.6 | 8.1 |
| 46.5 | 21.6 | 5.3 |
| 46.5 | 21.6 | 4.8 | include a portion with a smaller radius of curvature than the corner portion R, r. It contributes to decrease the incident angle of the laser beam on the welded portion.

Figure 11:
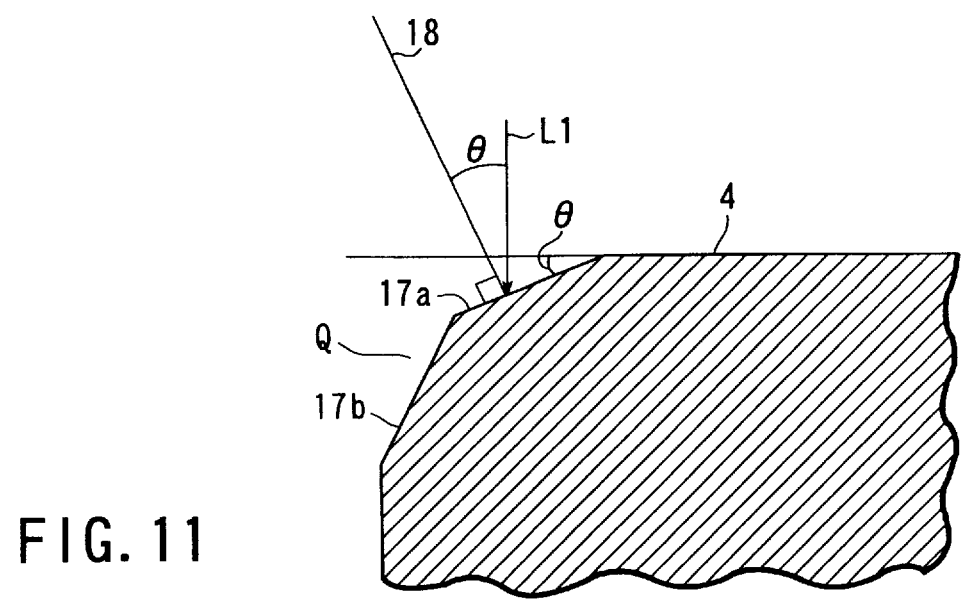
FIG. 11 is an enlarged cross-sectional view of the corner portion of the outer case shown in FIG. 9.

As is shown in FIG. 11, the angular portion Q, q is formed such that two flat portions 17a and 17b are continuously formed on the outer periphery of the corner portion R, r at an angle θ with respect to the long-side portion and short-side portion.

Figure 9:
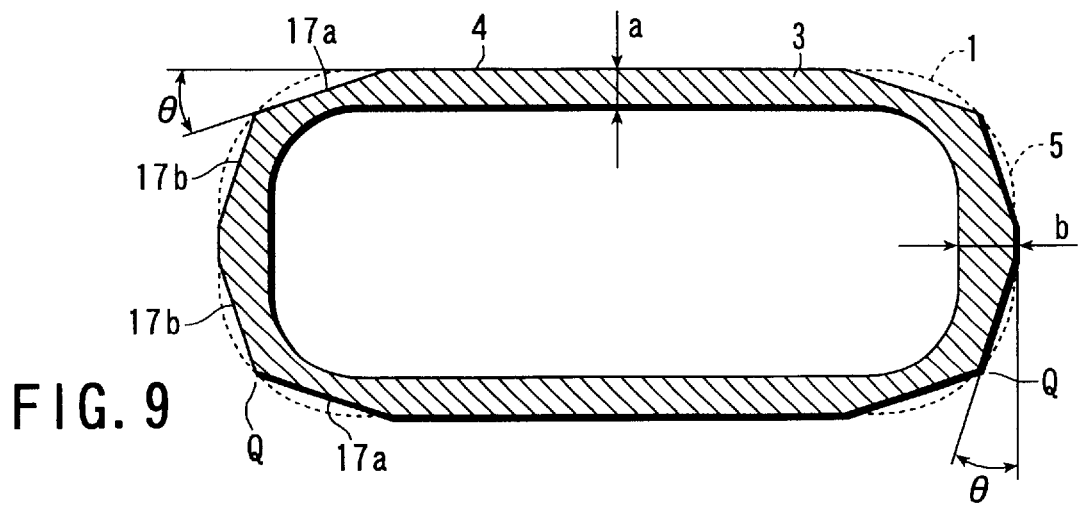
FIG. 9 is a cross-sectional view of the outer case taken along line IX—IX in FIG. 5.
Figure 10:
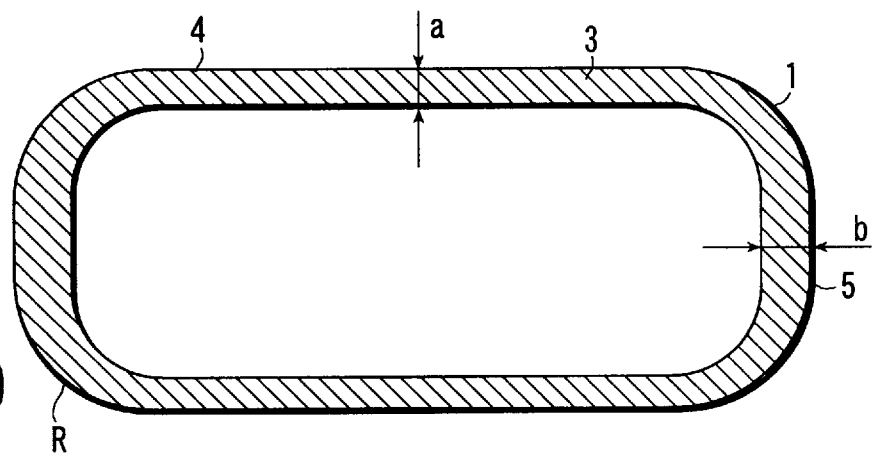
FIG. 10 is a horizontal cross-sectional view of the part of the outer case, other than the opening portion, in the first embodiment.

FIG. 9 is a cross-sectional view of the opening portion 3 of outer case 1, taken along line IX—IX in FIG. 5, and the outer periphery of the opening portion 3 is provided with angular portions Q. When the wall thickness of long-side portion 4 is a and the wall thickness of short-side portion 5 is b, the condition, a<b, is satisfied in order to reduce the expansion due to internal pressure of outer case 1, as described above. A hatched area indicates a cross section of the opening portion 3 with angular portions Q. An area defined by broken lines indicates a cross section of the portion of outer case 1, other than the opening portion 3, which has the corner portions R with a radius of curvature. FIG. 10 shows the cross sectional view of the portion of outer case 1, other than the opening portion 3.

The angular portion Q was formed such that the angle θ between the long-side portion 4 or short-side portion 5 and the angular portion Q shown in FIG. 9 is 15°. From geometrical calculations, the angle between the long-side portion 4 or short-side portion 5 and the flat portion 17a, 17b of angular portion Q is defined as θ, as shown in FIG. 11. The angle θ is equal to an angle between a plane 18 (indicated by a broken line) normal to the flat portion 17a, 17b and the laser beam L incident on the flat portion 17a, 17b.

Accordingly, the welding can be performed in the state in which the angle θ shown in the enlarged view of FIG. 11 meets the condition described in the "BACKGROUND OF THE INVENTION", θ<25°, i.e. cos θ>0.9.

When the angular portion Q, q was processed under the above-mentioned condition of the wall thickness and with the angle θ of 15° and 150 pairs of outer cases 1 and cover members 2 were welded, no cracks were produced in the welded members. By contrast, when the outer cases 1 and cover members 2 were welded without angular portions Q, q, cracks were produced in all welded members.

The angular portion Q, q is formed by a pressing process such as deep drawing. Specifically, after the outer case 1 and cover member 2 are formed, the corner portion R, r is pressed by a mold, and then the angular portion Q, q is formed. The method of forming the angular portion Q, q is not limited to the pressing process, and the angular portion Q, q may be formed by chamfering.

In this case, to keep constant the condition for welding the cover member 2 to opening portion 3 by means of the laser beam L, the relationship in thickness between the long-side portion 4 and short-side portion 5 of the opening portion 3 may be set to a=b, while it should be a<b in the portion of the outer case 1.

The ratio of the opening portion 3 to the outer case 1 in the height direction is small. Thus, with respect to the opening portion 3, even if the long-side portion 4 and short-side portion 5 are pressed to have the same wall thickness, the pressure-resistance properties of the outer case 1 are not substantially influenced.

When the outer case 1 and cover member 2 are formed of aluminum alloys, the materials are chosen such that the average Mg (magnesium) content of the aluminum alloys for the outer case 1 and than for the cover member is 1.0 wt % or less on average and the Mg content in the outer case 1 is greater than that in the cover member 2.

If the Mg content in the aluminum alloy is increased, the tensile strength increases. For example, when the Mg content is 2.8 wt %, the tensile strength is 285 to 290 MPa.

On the other hand, the boiling point of Mg is about 1100° C., which is for lower than that of aluminum, 2500° C. Consequently, during welding, Mg is selectively vaporized, resulting in a splash and porosities in the welded portion. Thus, the quality of welding is degraded.

By specifying the quantity of Mg in the outer case 1 and cover member 2, as described above, the quality of welding can be enhanced. In addition, since the Mg content in the outer case 1 is made greater than that in the cover member 2, the outer case 1 can have a great strength.

The results of experiments will now be described.

In Experiment 1, the outer case 1 was formed of an aluminum alloy comprising 1.0 to 1.5 wt % of Mn, 0.6 wt % or less of Si, 0.7 wt % or less of Fe, 0.25% or less of Cu, and 0.8 to 1.3 wt % of Mg. The cover member 2 was formed of an aluminum alloy comprising 1.0 to 1.5 wt % of Mn, 0.6 wt % or less of Si, 0.7 wt % or less of Fe, 0.25% or less of Cu, and 0.05 or less of wt % of Mg.

The coupled portion between the outer case 1 and cover member 2 was welded by the laser beam L. The Mg concentration in the welded portion was about 0.4 to 0.65 wt %, and welding was carried out without cracks.

In Experiment 2, the outer case 1 was formed of an aluminum alloy comprising 1.0 to 1.5 wt % of Mn, 0.3 wt % or less of Si, 0.7 wt % or less of Fe, 0.25% or less of Cu, and 0.8 to 1.3 wt % of Mg. The cover member 2 was formed of an aluminum alloy comprising 0.05 wt % or less of Mn, 0.25 wt % or less of Si, 0.4 wt % or less of Fe, 0.05% or less of Cu, and 0.05 or less of wt % of Mg.

The coupled portion between the outer case 1 and cover member 2 was welded by the laser beam L. The Mg concentration in the welded portion was about 0.4 to 0.65 wt %, and in this case, too, welding was carried out without cracks.

In Experiment 3, the outer case 1 was formed of an aluminum alloy comprising 0.8 to 1.4 wt % of Mn, 0.6 wt % or less of Si, 0.8 wt % or less of Fe, 0.25% or less of Cu, and 0.8 to 1.3 wt % of Mg. The cover member 2 was formed of an aluminum alloy comprising 1.0 to 1.5 wt % of Mn, 0.6 wt % or less of Si, 0.7 wt % or less of Fe, 0.25% or less of Cu, and 0.05 or less of wt % of Mg.

The coupled portion between the outer case 1 and cover member 2 was welded by laser beam L. The Mg concentration in the welded portion was about 0.4 to 0.65 wt %, and welding was carried out without cracks.

In order to increase the strength of the outer case 1, the Mg content in the aluminum alloy of the outer case 1 may be made greater than that in the above-described experiments. It was confirmed that when the Mg content was 1.9 wt % or less, the strength of the outer case 1 can be increased with no welding defects.

Figure 12:
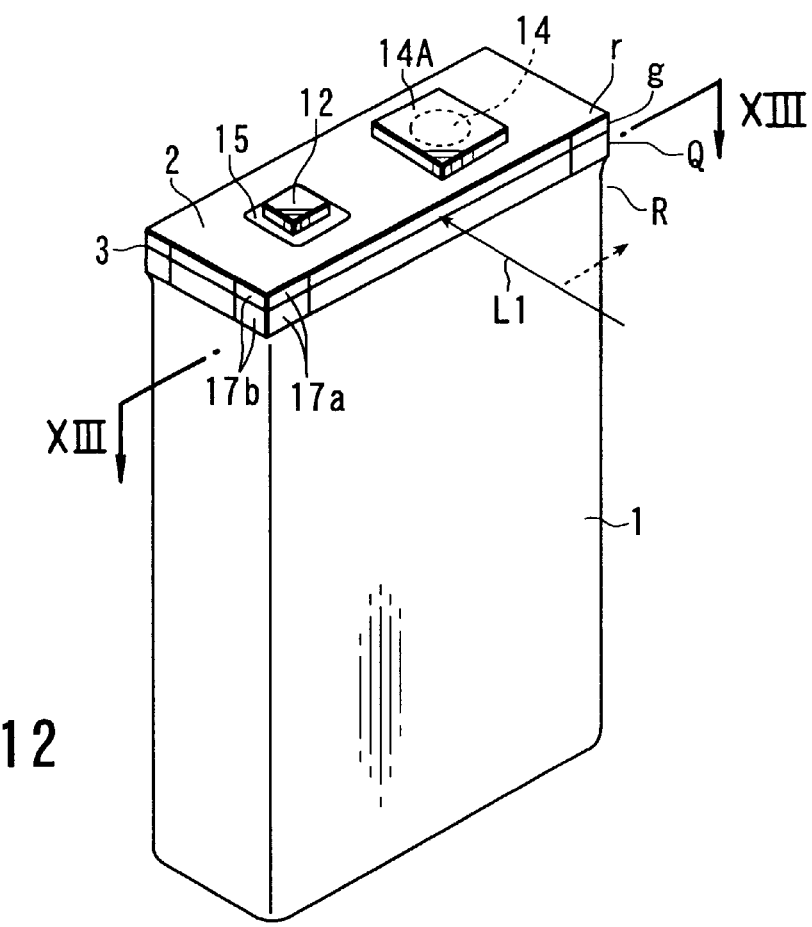
FIG. 12 is a perspective view showing a prismatic sealed battery according to a second embodiment of the invention.
Figure 13:
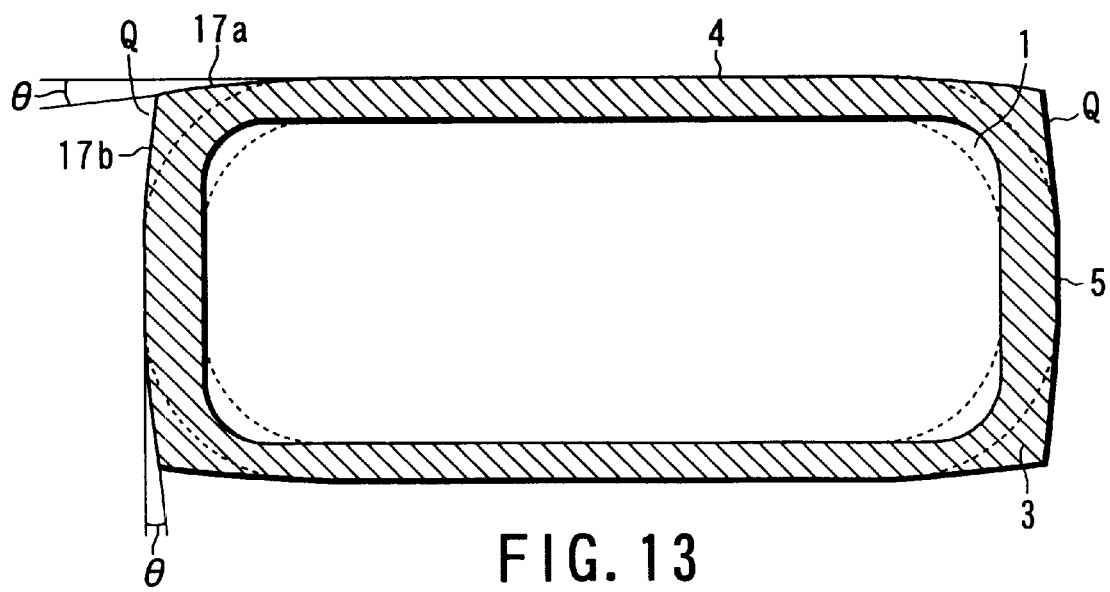
FIG. 13 is a cross-sectional view taken along line XIII—XIII in FIG. 12.

FIGS. 12 and 13 show a second embodiment of the invention. In the second embodiment, the radius of curvature of the inner periphery of the corner portion R of the opening portion 3 of the outer case 1 is made less than the radius of curvature of the other part of the outer case 1. Specifically, as shown in FIG. 13, a shape indicated by broken lines is the shape of the inner periphery of that portion of outer case 1, which is other than the opening portion 3. A shape indicated by solid lines is the shape of the inner periphery of the opening portion 3.

The outer periphery of the corner portion R and the corner portion r of the cover member 2 corresponding to the corner portion R are provided with angular portions Q and q, like the first embodiment.

FIG. 13 shows a cross section of the opening portion 3 of outer case 1. The angle θ between the long-side portion 4 and short-side portion 5 of the angular portion of the opening portion 3 meets the above-described condition, θ<25°. Accordingly, if the condition, cos θ>0.9, is satisfied, good welding can be performed.

The angular portion Q is formed by a pressing process such as deep drawing. Specifically, after the outer case 1 is formed, the angular portion Q is formed by an extrusion pressing process. In this embodiment, too, the relationship between the thickness a of long-side portion 4 and the thickness b of short-side portion 5 is set at a<b. This relationship may be set at a=b.

In this embodiment, a pulsed laser beam is used for welding. However, even if a laser beam of continuous wave (CW) is used, the same effect can be obtained if the radiation energy is set at a value suitable for welding.

In each of the above embodiments, the lithium ion rechargeable battery is applied to the outer case 1 for the prismatic sealed battery, by way of example. However, other types of rechargeable batteries, such as nickel metal hydride rechargeable batteries, may be used. Furthermore, in view of the advantage of the present invention, i.e. the increased strength, the prismatic sealed battery of this invention can be applied to the primary battery.

Figure 4:
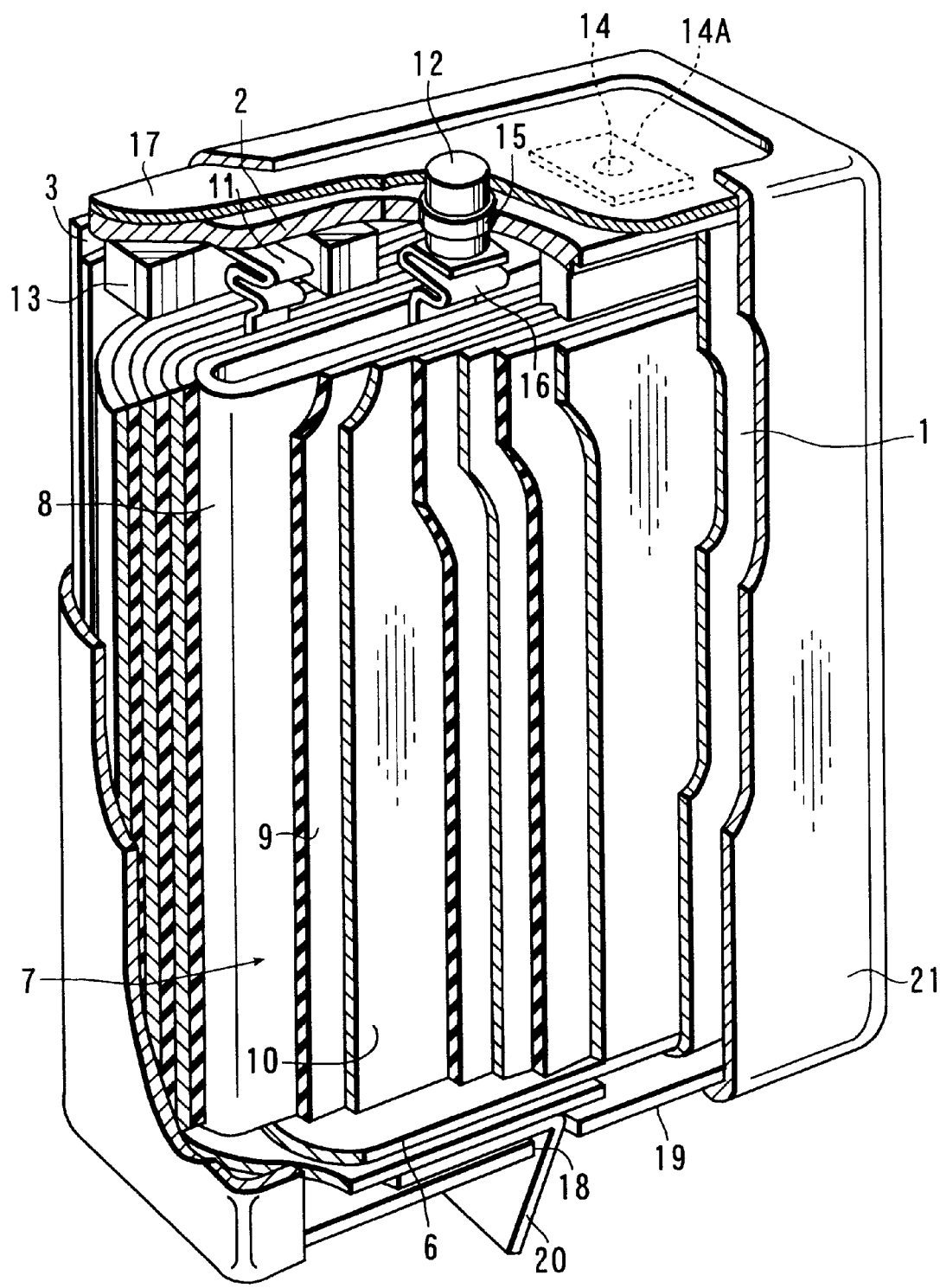
FIG. 4 is a partially cross-sectional perspective view of a prismatic sealed battery according to a first embodiment of the present invention.

A third embodiment of the present invention will now be described with reference to FIGS. 14 to 18. The prismatic sealed battery, as shown in FIG. 4, has a sealed container structure of an outer case 41 and a cover member 42. The cover member 42 is provided with a negative electrode 50 and a seal cover 51 for sealing an injection port for electrolyte.

Figure 14:
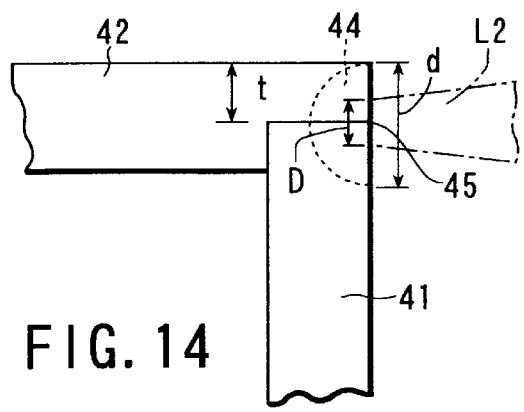
FIG. 14 is a view illustrating a welded portion according to a third embodiment of the invention.

FIG. 14 is a cross-sectional view illustrating the main feature of this embodiment, and shows a welded portion of the prismatic sealed battery. The wall thickness of the outer case 1 is 0.6 mm and the cover member 42 with a wall thickness of 1 mm is engaged with the opening portion of the outer case 41. The cover member 42 has a prismatic thin-plate shape and its peripheral portion is provided with a stepped portion of 0.3 mm. At the engagement portion between the cover member 42 and outer case 41, the end face in the thickness direction of the outer stepped portion is formed flush with the outer face of the outer case 41.

In this state, a coupled portion 45 between the outer case 41 and cover member 42 is seam-welded so that a welded portion 44 with a weld diameter (d) of about 0.8 mm is continuously formed by radiation of a YAG laser beam $L_2$ having a convergence diameter (D) of 0.45 mm. The outer case 41 is thus sealed by the cover member 42. In this case, the conditions for the YAG laser $L_2$ are as follows: repetition rate=20 to 30 Hz; pulse width=3 to 5 ms; and movement speed=5 to 10 mm/s. Nitrogen gas is applied to the welded portion, thereby preventing formation of porosities due to oxidation during welding.

Specifically, in order to prevent a crack from being produced during welding, the thickness (t) as measured from the outside face of the cover member 42 is set at 0.3 mm, and the condition, t<d/2, is met. Thus, a welded portion 44 reaching the edge portion is formed even with low welding energy, and a prismatic sealed battery having the structure wherein cracks are not easily produced in the welded portion can be obtained.

Figure 17:
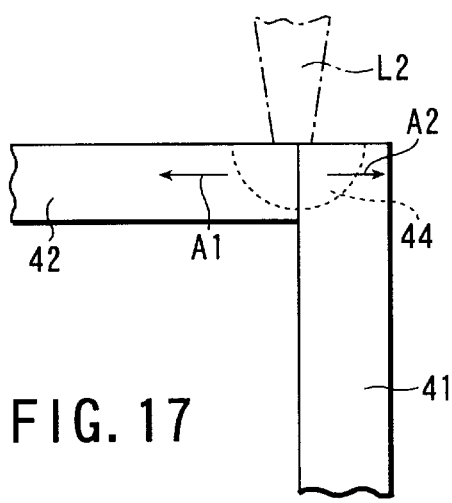
FIG. 17 is a view illustrating stress produced by welding when a welded portion has not reached the outer edge of the member.
Figure 18:
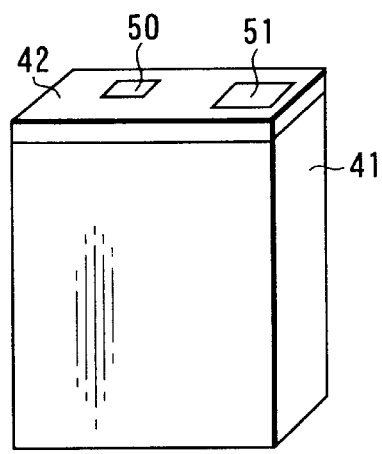
FIG. 18 is a view showing an external appearance of a prismatic sealed battery.

As is shown in FIG. 17, cracks are produced in the welded portion due to concentration of stress at a welded boundary portion, which results from a volumetric shrinkage occurring when the welded portion 44 coagulates. In the normal weld state, as shown in FIG. 17, the welded portion 44 does not reach outer edges on both sides. At the time of coagulation, since right and left sides (in the Figure) of the welded portion 44 are restricted, a stress is caused in directions of arrows $A_1$ and $A_2$, resulting in severe cracks.

Figure 16:
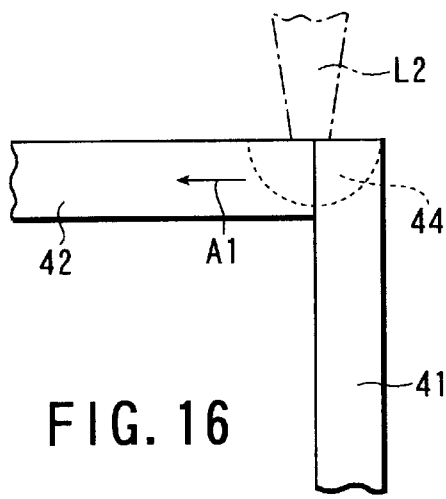
FIG. 16 is a view illustrating occurrence of stress at a time of welding when a welded portion has reached an outer edge of the member.

On the other hand, if one side of the welded portion 44 reaches the outer edge of the plate, as shown in FIG. 16, a stress acts in the direction of arrow $A_1$ at the weld boundary portion. At the time of coagulation, one side of the welded portion 44 is not restricted and made free. Compared to the case where both sides are restricted, the stress caused at the weld boundary portion is low, suppressing the cracks produced.

Figure 15:
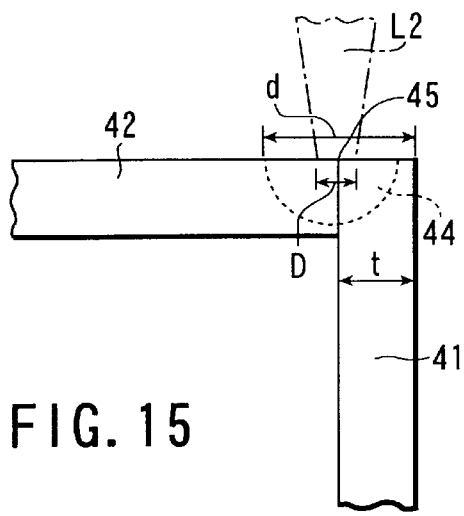
FIG. 15 is a view illustrating a welded portion according to a modification of the third embodiment.

In the above embodiment, as shown in FIGS. 14 and 15, the radius of welded portion (d/2) is made greater than the thickness t of welded portion as measured from the outside edge of cover member 42 or the wall thickness t of outer case 41. Thereby, the welded portion is made to reach the outer edge of the plate, and one side of the welded portion 44 is made free. Thus, the stress caused at the weld boundary portion during coagulation is reduced.

When the scan center of the laser beam $L_2$ is made to agree with the coupled portion 45 between the cover member 42 and outer case 41, whole of the laser beam $L_2$ is incident on the cover member 42 and outer case 41. For this purpose, it is desirable in this embodiment that the spot diameter (D) of YAG laser beam $L_2$ is set at D/2<t.

Accordingly, a proper range of weld energy is increased and a stable process can be performed even if the laser radiation energy varies. The YAG laser is used as an oscillation source of the laser beam because the YAG laser has a shorter wavelength than a carbon dioxide laser and has a lower reflectance on aluminum or an alloy thereof than the carbon dioxide gas laser. Accordingly, the YAG laser can achieve the welding with higher efficiency.

Table 3 (below) shows measures results on the relationship among the thickness of the weld portion, as measured from the outer edge of cover member 42, the corresponding proper range of weld energy, and the crack defect ratio at the laser weld portion.

TABLE 3

| Energy (J) (present invention) | Crack defect ratio Thickness t of weld portion measured from outer edge of cover member 2 | | |
|---|---|---|---|
| | 0.3 mm | 0.4 mm | 0.5 mm |
| 4.4 | 18% | 62% | 100% |
| 4.8 | 0% | 2% | 18% |
| 5.3 | 0% | 0% | 0% |
| 5.8 | 0% | 0% | 0% |

When the thickness (t) of the weld portion, as measured from the outer edge of cover member 42, is 0.5 mm, the range of weld energy, which produces no crack, is 5.3 to 5.8J (±15%). The pulse energy exceeding 5.8J is improper since it causes thermal damage to the electrode element. On the other hand, when the thickness (t) of the weld portion, as measured from the outer edge of cover member 42, is 0.3 mm, the range of weld energy, which produces no crack, is 4.8 to 5.8J (±10%). Even if the radiation energy slightly varied, highly stable weld was made. Since the weld diameter of the weld portion is 0.8 mm and the convergence diameter of laser beam $L_2$ is 0.45 mm, when the thickness (t) of the weld portion, as measured from the outer edge of cover member 42, is 0.3 mm, the relationship $D/2 < t < d/2$ is satisfied and the weld portion 44 reaches the outer edge of the cover member 42.

Since the relationship, d/2<t, is present when the thickness of the weld portion, as measured from the outer edge of cover member, is 0.5 mm, the weld portion 44 does not reach the outer edge of cover member 42, resulting in severe cracks.

The direction of the coupled face is changed in various directions in accordance with the relationship of coupling between the outer case 1 and cover member 42. FIG. 15 shows a modification of the third embodiment. In the embodiment shown in FIG. 14, the coupled face between the outer case 41 and cover member 42 is perpendicular to the direction of the opening of the outer case 41. In the modification shown in FIG. 15, the coupled face is parallel to the direction of the opening. The structures in FIGS. 14 and 15 are different only with respect to the direction of the coupled face, and the elements denoted by reference numerals are the same or have the same functions. Therefore, the same advantage can be obtained with the structures shown in FIGS. 14 and 15.

In this embodiment, a pulsed laser beam is used as laser beam $L_2$. However, even if a laser beam of continuous wave (CW) is used, the same effect can be obtained if the radiation energy is set at a value suitable for welding.

In the above embodiment, the invention is applied to the outer case 41 for the prismatic sealed battery such as the lithium ion batteries. However, the invention is also applicable to laser welding of outer cases of cylindrical batteries or components of aluminum alloy material of general household electric devices or vehicles. Needless to say, the invention can be modified variously without departing from the spirit of the invention.

FIGS. 19 to 25 show a fourth embodiment of the present invention.

Figure 19:
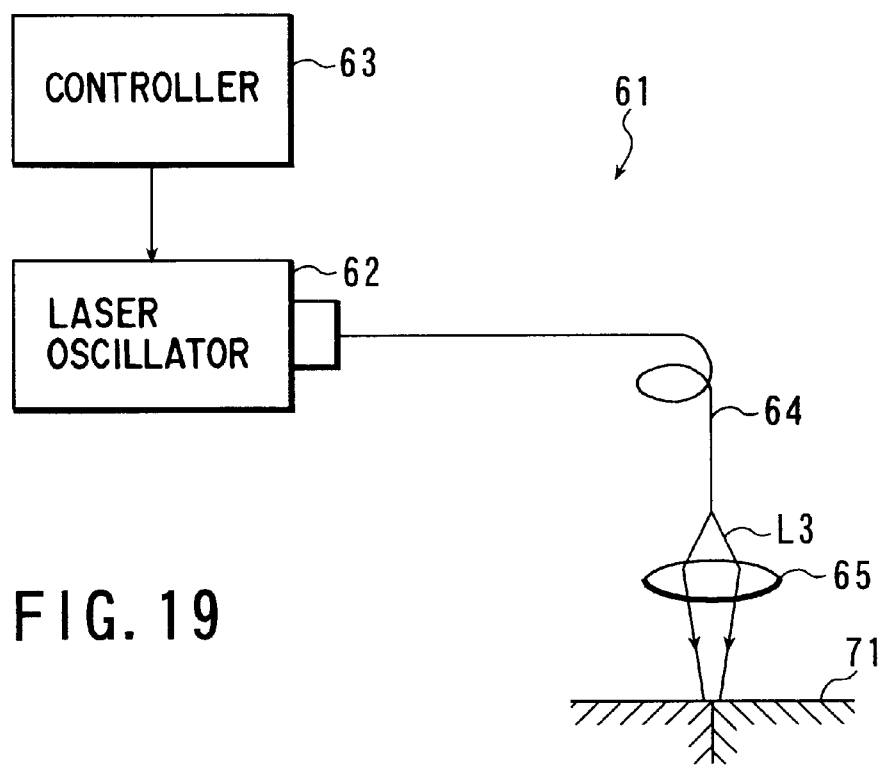
FIG. 19 is a view illustrating a laser welding apparatus according to a fourth embodiment of the invention.

FIG. 19 shows a laser weld apparatus 61 for working the present invention. The laser weld apparatus 61 comprises a laser oscillator 62 such as a YAG laser for oscillation-outputting a pulsed laser beam $L_3$. A controller 63 is connected to the laser oscillator 62. The controller 63 controls a pulse waveform and an output peak value P of the pulse laser beam $L_3$ oscillation-outputted from the controller 63.

The pulsed laser beam $L_3$ oscillation-outputted from the laser oscillator 62 is input to an optical fiber 64. The pulsed laser beam $L_3$ emitted from the optical fiber 64 is made incident on a convergence lens 65 and is converged through the lens 65. The converged beam $L_3$ is radiated on, and welds, a prismatic sealed battery 71 shown in FIG. 22 or a member to be welded. In this case, the laser beam $L_3$ is moved at a feed speed of 10 mm/s by a scan mechanism (not shown).

A shield gas is supplied from a nozzle (not shown) to the welded portion of the to-be-welded member on which is irradiated with the pulsed laser beam $L_3$. The shield gas is an inert gas such as nitrogen, argon or helium. Thereby, formation of porosities due to oxygen is prevented at the welded portion of the to-be-welded member.

Figure 22:
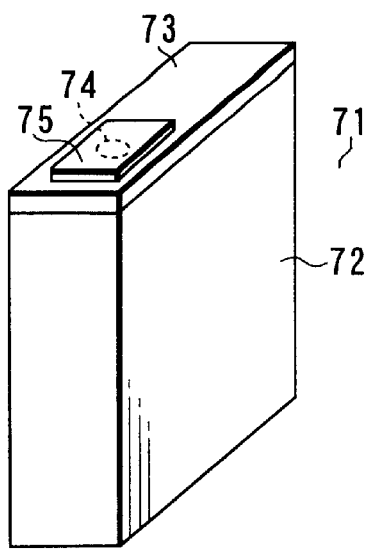
FIG. 22 is a perspective view for describing the prismatic sealed battery according to the fourth embodiment.

The prismatic sealed battery 71 comprises an outer case 72 and a cover member 73, as shown in FIG. 22. An injection port 74 formed in the cover member 73 is sealed by a seal cover 75. These members 72, 73 and 75 are formed of aluminum or aluminum alloys. The aluminum alloy is one containing manganese or magnesium, as specified AA standards 3003 and 5052.

Figure 23:
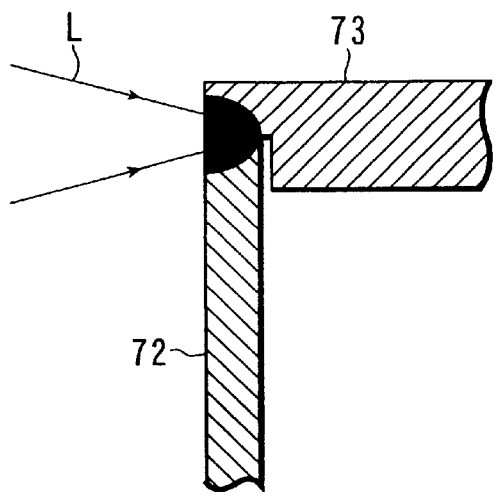
FIG. 23 is a cross-sectional view of a welded portion between the outer case and the cover member in the fourth embodiment.
Figure 24A:
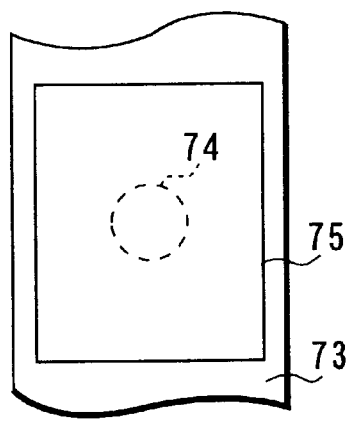
FIG. 24A is a plan view of a welded portion between a cap member and a seal member in the fourth embodiment.
Figure 24B:
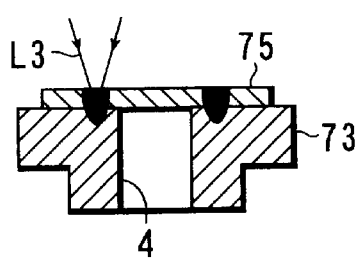
FIG. 24B is a cross-sectional view of the welded portion between the cap member and seal member in the fourth embodiment.

The outer case 72 and cover member 73 are abutted on each other and welded by the pulsed laser beam L, as shown in FIG. 23. The cover member 73 and seal member 75 are placed on each other and welded, as shown in FIGS. 24A and 24B. In this example, the wall thickness of the outer case 72 is set at 0.3 to 0.5 mm, and the wall thickness at the abutted portion of the cover member 73 is also set at 0.3 to 0.5 mm. The wall thickness of the cover member 73 itself is set at 1.0 mm, and that of the seal cover 75 is set at 0.2 mm.

When the components (outer case 72, cover member 73, and seal cover 75) of the prismatic sealed battery 71 are welded, the output peak value P and pulse waveform of the pulsed laser beam $L_3$, which is oscillation-outputted at 20 Hz from the laser oscillator 62, are set at predetermined states.

Specifically, it is desirable that the output peak value P of the pulsed laser beam $L_3$ be set at $1 \times 10^{10}$ W/m² or more, e.g. $2 \times 10^{10}$ W/m² in this embodiment. In addition, the pulse waveform is set to one of those shown in FIGS. 21A to 21E. The input energy of the pulsed laser beam $L_3$ is 3 to 4J per pulse, and the convergence diameter of the beam is 0.45 mm. The pulse interval is not less than the pulse width.

Figure 20:
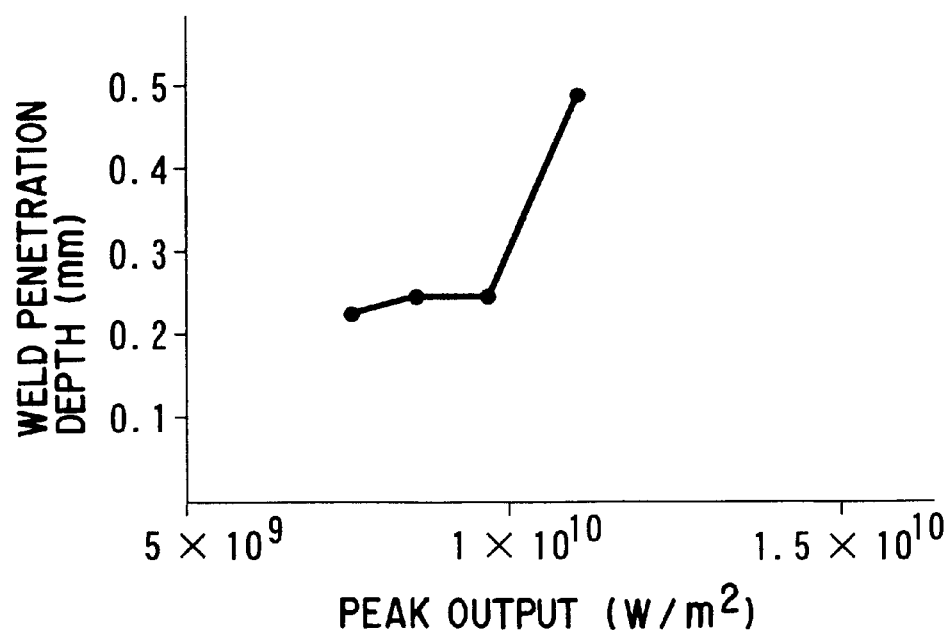
FIG. 20 is a graph showing a relationship between an peak power of pulsed laser beams and the penetration depth in the fourth embodiment.

In order to weld the components of the prismatic sealed container 71 with a sufficient weld depth, as described above, it is desirable that the output peak value P of the pulsed laser beam $L_3$ be set at $2 \times 10^{10}$ W/m² or more. In this embodiment, the weld diameter is set at 0.8 mm. FIG. 20 shows experimental results on the relationship between the output peak value of the pulsed laser beam $L_3$ and the weld depth.

As is understood from FIG. 20, when the peak value P of the pulsed laser beam $L_3$ has reached $1 \times 10^{10}$ W/m² or more, the energy absorption ratio increases and the weld depth sharply increases. Accordingly, in this embodiment, the output peak value P of the pulsed laser beam $L_3$ was set at $2 \times 10^{10}$ W/m², as mentioned above, and thus the weld portion could be welded with a weld depth enough to obtain a predetermined weld strength.

Figure 21A:
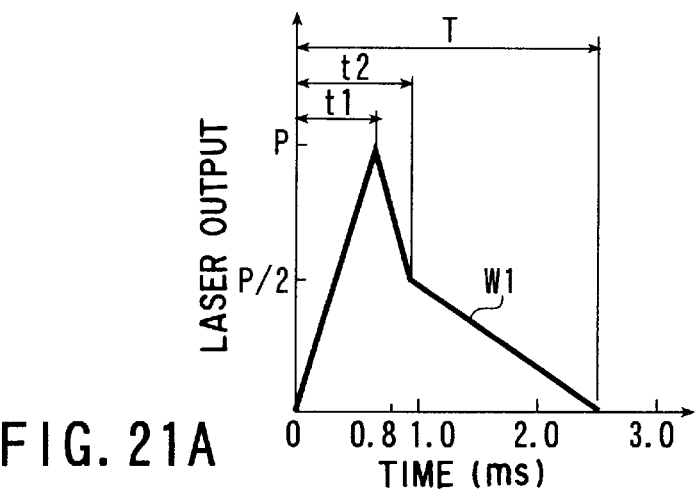
FIGS. 21A to 21E are views illustrating different pulse waveforms.
Figure 21B:
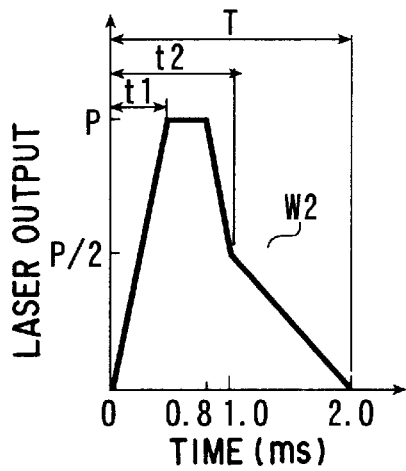
Figure 21D:
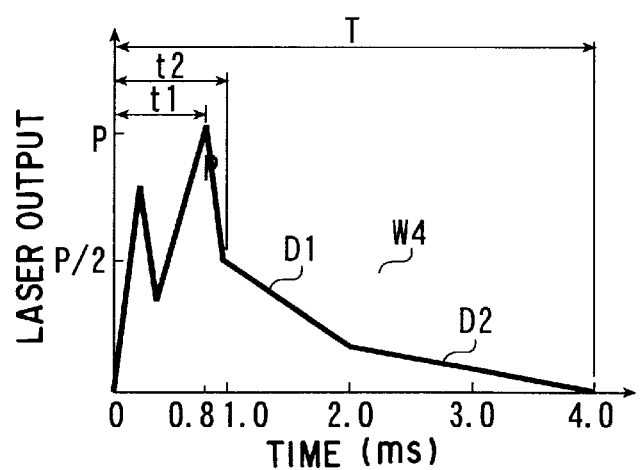
Figure 21C:
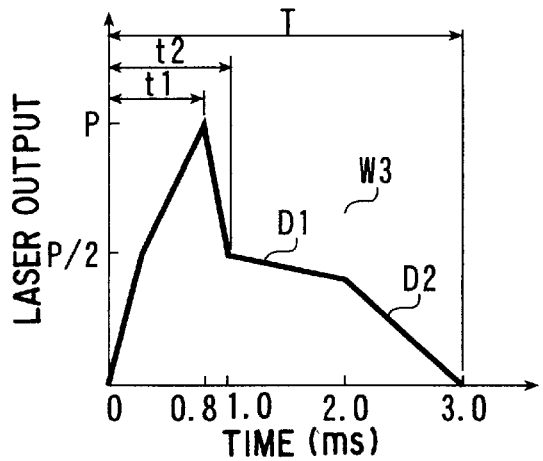
Figure 21E:
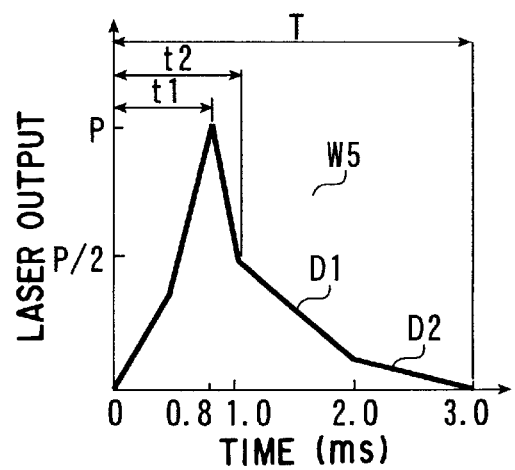

The waveform of the pulsed laser beam L is set to, for example, first waveform $W_1$ shown in FIG. 21A among those shown in FIGS. 21A to 21E. As regards the first waveform $W_1$, a time $t_1$ between a time point at which the oscillation begins and a time point at which the output reaches peak value P is set at $t_1 \leq 0.8$ ms, and the first waveform $W_1$ is set at 0.7 ms. A time $t_2$ between a time point at which the pulsed laser beam L is output and a time point at which the output decreases to ½ of the peak value after having passed the peak value P is set at $t_2 \leq 1.0$ ms.

The output of the pulsed laser beam $L_3$ decreases gradually in a time period between a time point at which the output has decreased to ½ of the peak value P and a time point at which the output has decreased to zero. The pulse width T is set at $T \geq 2.0$ ms or more, and specifically at 2.6 ms in the first waveform $W_1$ of this embodiment.

In a case where the pulsed laser beam $L_3$ of the first waveform $W_1$ is radiated to the welded portion of the outer case 1, the time needed for the output to reach the peak value P is as short as 0.8 ms or less. Thus, even if the material of prismatic sealed battery 71 is aluminum or alloys thereof and the thermal diffusion rate is high, the welding can be carried out with relatively high efficiency. Specifically, if the time $t_1$ is set at $t_1 \leq 0.8$ ms, in addition to the setting of the output peak value P of the pulsed laser beam L at $2 \times 10^{10}$ W/m², the to-be-welded portion can be locally welded with a high efficiency and sufficient penetration depth.

Since the time $t_2$ between a time point at which the oscillation begins and a time point at which the output peak value decreases to ½ of the peak value after having passed the peak value P is set at 1.0 ms or less, the value $(t_2-t_1)$ can be set to be relatively short and the quantity of heat into the prismatic sealed battery 71 can be decreased. Thereby, the rise in temperature of the prismatic sealed battery 71 can be suppressed, and the separator between the positive and negative electrodes, which is formed by winding a low-melting-point resin material such as fluororesin, polypropylene or polyethylene, can be put in the prismatic sealed battery 71. Accordingly, even if the present invention is applied to the welding for the components of the prismatic sealed battery such as a lithium ion battery, the resin material is not thermally damaged.

The output is gradually decreased in the time period between the time point at which the output has decreased to ½ of the peak value P and the time point at which the output has decreased to zero. In addition, the pulse width T is set at 2.6 ms. Thus, the cooling time period $(T-t_1)$ in which the output of pulse laser beam L has decreased from peak value P to zero can be made longer than the heating time period $t_1$ in which the output of pulse laser beam L rises from zero to peak value P. Therefore, the cooling rate of the welded portion can be made lower than the heating rate.

Accordingly, the cooling rate of the welded portion after welding, is decreased, resulting in a suppressing cracks formed in the welded portion.

Second to fifth pulse waveforms $W_2$ to $W_5$ shown in FIGS. 21B to 21E will now be described. In the second waveform $W_2$, the time $t_1$ needed for the output to reach peak value P is set at 0.5 ms and the peak value P is continued until 0.8 ms. The time $t_2$ needed for the output to fall to ½ of peak value P is 1.0 ms and the pulse width T is 2.0 ms.

In the third waveform $W_3$, the time $t_1$ needed for the output to reach peak value P is set at 0.8 ms and the time $t_2$ needed for the output to fall to ½ of peak value P is 1.0 ms. Although the pulse width T is set at 3.0 ms, the time period in which the output decreases from ½ of the peak value P to zero is divided into a first decreasing portion $D_1$ spanning between 1.0 ms and 2.0 ms and a second decreasing portion $D_2$ spanning between 2.0 ms and 3.0 ms. The rate of decrease in the first decreasing portion $D_1$ is lower than that in the second decreasing portion $D_2$. Thus, the cooling rate of the welded portion of the to-be-welded component can be made lower.

In the fourth waveform $W_4$ the time $t_1$ needed for the output to reach the peak value P is set at 0.8 ms. Before the output reaches peak value P, the output is once raised sharply up to about ¾ of the peak value P, and then the output is decreased slightly lower than ½ of peak value P. Subsequently, the output is raised to peak value P.

The time $t_2$ needed for the output to fall from peak value P to ½ of peak value P is 1.0 ms. The following cooling period is, like the third waveform $W_3$, divided into a first decreasing portion $D_1$ and a second decreasing portion $D_2$. The first decreasing portion $D_1$ is a time period of 1.0 ms ranging between 1.0 ms and 2.0 ms, and the second decreasing portion $D_2$ is a time period of 2.0 ms ranging between 2.0 ms and 4.0 ms. Besides, the pulse width T is set at 4.0 ms.

In the fifth waveform $W_5$, the time $t_1$ needed for the output to reach peak value P is set at 0.8 ms and the time $t_2$ needed for the output to fall to ½ of peak value P is 1.0 ms. The time period in which the output decreases from ½ of the peak value P to zero is divided into a first decreasing portion $D_1$ spanning between 1.0 ms and 2.0 ms and a second decreasing portion $D_2$ spanning between 2.0 ms and 3.0 ms. Accordingly, the pulse width T is set at 3.0 ms. In the fifth waveform $W_5$, the upward line of the output reaching the peak value P is not straight but is bent midway.

The present invention is not limited to the above embodiments, and various modifications may be made. For example, the waveform which can be used in the present invention is not limited to the above-described first to fifth waveforms. Various waveforms can be used if the time $t_1$ needed for the output to reach peak value P, the time $t_2$ needed for the output to fall to ½ of peak value P and the pulse width T meet predetermined conditions, and the output gradually decreases after it falls to ½ of peak value P.

Figure 25:
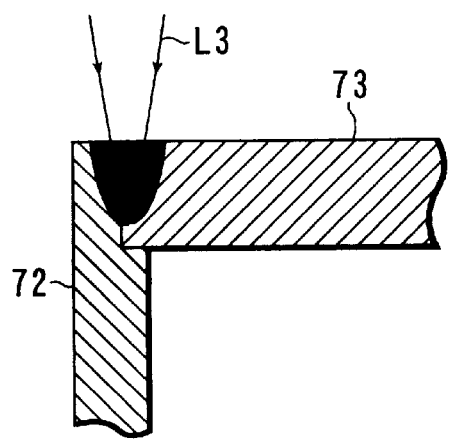
FIG. 25 is a cross-sectional view of a welded portion in a case where the cap member is embedded in the outer case and these are welded in the fourth embodiment.

As is shown in FIG. 25, the cover member 73 may be fitted in the opening portion of outer case 72 and the coupled portion therebetween may be welded by radiation of pulse laser beam $L_3$.

The member to be welded is not limited to the prismatic sealed battery, and this invention is applicable to welding which requires efficient melting and prevention of a crack of the welded portion due to quick cooling.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A prismatic sealed battery comprising:
   a metallic outer case having an opening portion and a first corner portion at an outer periphery of the opening portion;
   a power generating element stored within the outer case and having a positive electrode and a negative electrode opposed to each other, with a separator interposed;
   a metallic cover member coupled to the opening portion of the outer case, provided with a second corner portion corresponding to the first corner portion of the outer case, and welded to the outer case, with a coupled portion between the cover member and the outer case irradiated with a laser beam; and
   an electrode element electrically connected to the power generating element,
   wherein the first and second corner portions which are irradiated with the laser beam, are shaped as angular portions constituting flat faces being inclined at a predetermined angle to the periphery of the cover member, and the first and second corner portions are formed continuously with each other.

2. The prismatic sealed battery according to claim 1, wherein the outer case has a prismatic cross section with long-side and short-side portions, and each of the angular portions comprises two flat faces, and
   one of the two flat faces is set at an angle of 25° or less to the long-side portion, and the other flat face is set at an angle of 25° or less to the short-side portion.

3. The prismatic sealed battery according to claim 1, wherein the outer case and the cover member are formed of an aluminum alloy containing 1.0 wt % or less a Mg (magnesium) as an average content of the outer case and the cover member, and the Mg content in the outer case is greater than the Mg content in the cover member.

4. The prismatic sealed battery according to claim 3, wherein the Mg content in the outer case is 1.9 wt % or less, and the Mg content in the cover member is 0.1 wt % or less.

5. The prismatic sealed battery according to claim 3, wherein the outer case has a Mn (manganese) content of 1.0 to 1.5 wt %, an Si (silicon) content of 0.6 wt % or less, and a Mg content of 0.8 to 1.3 wt %, and
   the cover member has a Mn (manganese) content of 1.5 wt % or less, an Si (silicon) content of 0.6 wt % or less, and a Mg content of 0.05 wt % or less.

6. A prismatic sealed battery comprising:
   a metallic outer case having an opening portion;
   a power generating element stored within the outer case and having a positive electrode and a negative electrode opposed to each other, with a separator interposed;
   a metallic cover member welded to the opening portion by radiation of a laser beam; and
   an electrode element electrically connected to the power generating element,
   wherein the outer case has a substantially prismatic cross-sectional shape in parallel to an opening face of the opening portion, the cross-sectional shape having long-side and short-side portions, and a wall thickness of the short-side portion is greater than a wall thickness of the long-side portion.

7. The prismatic sealed battery according to claim 6, wherein outer peripheral portions of corner portions of the outer case and the cover member, which are irradiated with the laser beam, are shaped as angular portions constituting flat faces being inclined at a predetermined angle along the periphery thereof, and the corner portions of outer case and cover member are formed continuously each ether.

8. The prismatic sealed battery according to claim 7, wherein each of the angular portions comprises two flat faces, and
   one of the two flat faces is set at an angle of 25° or less to the long-side portion, and the other flat face is set at an angle of 25° or less to the short-side portion.

9. The prismatic sealed battery according to claim 6, wherein the outer case and the cover member are formed of aluminum alloys containing 1.0 wt % or less a Mg (magnesium) as an average content of the outer case and the cover member, and the Mg content in the outer case is greater than the Mg content in the cover member.

10. The prismatic sealed battery according to claim 9, wherein the Mg content in the outer case is 1.9 wt % or less, and the Mg content in the cover member is 0.1 wt % or less.

11. The prismatic sealed battery according to claim 9, wherein the outer case has a Mn (manganese) content of 1.0 to 1.5 wt %, an Si (silicon) content of 0.6 wt % or less, and a Mg content of 0.8 to 1.3 wt %, and
   the cover member has a Mn (manganese) content of 1.5 wt % or less, an Si (silicon) content of 0.6 wt % or less, and a Mg content of 0.05 wt % or less.

12. A prismatic sealed battery comprising:
   a metallic outer case having an opening portion;
   a power generating element stored within the outer case and having a positive electrode and a negative electrode opposed to each other, with a separator interposed;
   a metallic cover member welded to the opening portion irradiated with a laser beam; and
   an electrode element electrically connected to the power generating element,
   wherein the cover member has the following relationship, $$0 < t < d/2$$

wherein t is a thickness of an end face portion irradiated with the laser beam of the cover member or the outer case, and d is a diameter of a welded portion formed by welding with the opening portion.

13. A method of manufacturing a prismatic sealed battery, the method comprising the steps of:
   storing a power generating element within a metallic prismatic outer case, the power generating element having a positive electrode and a negative electrode, with a separator interposed, the outer case having an opening portion and a first corner portion at an outer periphery of the opening portion;
   forming an electrode terminal electrically connected to the power generating element;

welding a metallic cover member having a second corner portion at a periphery thereof to the opening portion, with a coupled portion between the cover member and the opening portion irradiated with a laser beam;

injecting an electrolyte in the outer case before or after the cover member is welded to the opening portion; and shaping the first corner portion of the opening portion and the second corner portion of the cover member as angular portions, before the cover member is welded to the opening portion by the laser beam.

14. The method according to claim 13, wherein in the step of shaping the first and second corner portions as angular portions, the corner portions are chamfered at predetermined angles in the circumferential directions thereof.

15. The method according to claim 13, wherein in the step of shaping the first and second corner portions as angular portions, the radius of curvature of the corner portions is decreased by a pressing process.

16. A method of manufacturing a prismatic sealed battery, the method comprising the steps of:

storing a power generating element within a metallic prismatic outer case, the power generating element having a positive electrode and a negative electrode, with a separator interposed, the outer case having an opening portion and a prismatic cross-sectional shape in parallel to the opening portion;

forming an electrode terminal electrically connected to the power generating element;

welding a metallic cover member to the opening portion irradiated with a laser beam;

injecting an electrolyte in the outer case before or after the cover member is welded; and making a wall thickness of a short-side portion of the prismatic outer case greater than a wall thickness of a long-side portion of the prismatic outer case before the power generating element is stored within the outer case.

17. A method of manufacturing a prismatic sealed battery, the method comprising the steps of:

storing a power generating element within a metallic prismatic outer case, the power generating element having a positive electrode and a negative electrode, with a separator interposed, the outer case having an opening portion and a prismatic cross-sectional shape in parallel to the opening portion;

forming an electrode terminal electrically connected to the power generating element; and welding a metallic cover member to the opening portion irradiated with a laser beam, wherein the energy of the laser beam is set to satisfy the following relationship, $$0 < t < d/2$$

wherein t is a thickness of an end face portion irradiated with the laser beam, of the cover member or the outer case, and d is a diameter of a welded portion formed by welding between the opening portion and the cover member.

18. The method according to claim 17, wherein a beam convergence diameter of the laser beam is set to satisfy the following relationship, $$D/2 < t < d/2$$

wherein D is the beam convergence diameter of the laser beam.

19. A method of manufacturing a prismatic sealed battery, the method comprising the steps of:

storing a power generating element within a metallic prismatic outer case, the power generating element having a positive electrode and a negative electrode, with a separator interposed, the outer case having an opening portion and a prismatic cross-sectional shape in parallel to the opening portion;

forming an electrode terminal electrically connected to the power generating element; and welding a metallic cover member to the opening portion irradiated with a laser beam, wherein the laser beam has such a waveform that a time $t_1$ needed for an output of the laser beam reaches a maximum output value P is $t_1 \leq 0.8$ ms, a time $t_2$ needed for the output to fall to ½ of the maximum output value P is $t_2 \leq 1.0$ ms, the output after $t_2$ decreases gradually, and a pulse width T is $T \geq 2.0$ ms.

20. The method according to claim 19, wherein the maximum output value is $1 \times 10^1$ W/m² or more.

21. The method according to claim 19, further comprising a step of sealing the cover member and a metallic seal cover by welding with the laser beam, the cover member including an injection port for injecting an electrolyte in the outer case.

* * * * *